United States Patent
Matsumura et al.

(10) Patent No.: US 11,962,038 B2
(45) Date of Patent: Apr. 16, 2024

(54) POWER STORAGE COMPONENT MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Nobuyuki Matsumura, Mie (JP); Shinichi Takase, Mie (JP); Hiroki Shimoda, Mie (JP); Yusuke Suzuki, Aichi-ken (JP); Isamu Hamamoto, Mie-ken (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Mie (JP); TOYOTA JIDOSHA KABUSHIKI KAISHA, Osaka (JP)

( * ) Notice: Subject to any disclaimer, the term of this patent is extended or adjusted under 35 U.S.C. 154(b) by 710 days.

(21) Appl. No.: 16/973,487

(22) PCT Filed: May 30, 2019

(86) PCT No.: PCT/JP2019/021480
§ 371 (c)(1),
(2) Date: Dec. 9, 2020

(87) PCT Pub. No.: WO2019/239904
PCT Pub. Date: Dec. 19, 2019

(65) Prior Publication Data
US 2021/0242540 A1    Aug. 5, 2021

(30) Foreign Application Priority Data
Jun. 13, 2018    (JP) ................ 2018-112960

(51) Int. Cl.
*H01M 50/503*    (2021.01)
*H01M 50/209*    (2021.01)
(Continued)

(52) U.S. Cl.
CPC ....... *H01M 50/503* (2021.01); *H01M 50/209* (2021.01); *H01M 50/50* (2021.01); *H01M 50/505* (2021.01); *H01M 2220/20* (2013.01)

(58) Field of Classification Search
CPC .................... H01M 50/503; H01M 50/505
See application file for complete search history.

(56) References Cited

U.S. PATENT DOCUMENTS

| 9,905,831 B2 | 2/2018 | Nakayama |
| 10,008,836 B2 | 6/2018 | Nakayama et al. |

(Continued)

FOREIGN PATENT DOCUMENTS

| CN | 103548181 | 1/2014 |
| JP | 9-92259 | 4/1997 |

(Continued)

OTHER PUBLICATIONS

International Search Report issue in International Patent Application No. PCT/JP2019/021480, dated Aug. 6, 2019, along with English language translation thereof.

(Continued)

*Primary Examiner* — Christopher P Domone
*Assistant Examiner* — Jonathan William Estes
(74) *Attorney, Agent, or Firm* — GREENBLUM & BERNSTEIN, P.L.C.

(57) ABSTRACT

A power storage component module includes power storage components and a bus bar connecting the power storage components to one another. At least one positioning boss is provided on an electrode included in the power storage components. The at least one positioning boss protrudes (Continued)

upward. The at least one positioning boss includes a base end and a distal end having a diameter less than a diameter of the base end. At least one through hole opens in the bus bar. The bus bar is placed on the at least one positioning boss and a hole edge of the at least one through hole is disposed around the at least one positioning boss between the base end of the at least one positioning boss and the distal end of the at least one positioning boss in a vertical direction.

3 Claims, 7 Drawing Sheets

(51) Int. Cl.
*H01M 50/50* (2021.01)
*H01M 50/505* (2021.01)

(56) References Cited

U.S. PATENT DOCUMENTS

| | | | |
|---|---|---|---|
| 10,761,142 B2 | 9/2020 | Ota et al. | |
| 2014/0072861 A1* | 3/2014 | Nakayama | H01M 50/503 429/158 |
| 2015/0243947 A1 | 8/2015 | Seto et al. | |
| 2017/0179458 A1* | 6/2017 | Sato | H01M 50/507 |
| 2018/0088179 A1 | 3/2018 | Ota et al. | |

FOREIGN PATENT DOCUMENTS

| | | | |
|---|---|---|---|
| JP | 2011-233491 | | 11/2011 |
| JP | 2011-233492 | | 11/2011 |
| JP | 2012-028050 | | 2/2012 |
| JP | 2012028050 A | * | 2/2012 |
| JP | 2015-022965 | | 2/2015 |
| JP | 2015-049930 | | 3/2015 |
| JP | 2016-100248 | | 5/2016 |
| JP | 2017-004803 | | 1/2017 |
| JP | 2018-055843 | | 4/2018 |
| WO | 2014/064888 | | 5/2014 |

OTHER PUBLICATIONS

Written Opinion issued in International Patent Application No. PCT/JP2019/021480, dated Aug. 6, 2019, along with English language translation thereof.

* cited by examiner

POWER STORAGE COMPONENT MODULE

TECHNICAL FIELD

The technology disclosed herein relates to a power storage component module, and more particularly, relates to a connecting structure between power storage components.

BACKGROUND ART

A power storage component module disclosed by Patent Document 1 has been known as an example of a power storage component module including power storage components. The battery module includes battery packs and a bus bar. Each of the battery packs includes electrodes. Each of the electrodes has a flat top surface that is defined as an electrode surface. The bus bar is made from plates and in a rectangular shape. The battery packs are arranged so that the electrodes that are adjacent to each other have different polarities. A wiring module is attached to surfaces on which the electrodes are disposed. The bus bar and the electrodes in the wiring module have sections that overlap each other. The bus bar and the electrodes are electrically connected by laser welding the sections of the bus bar to the sections of the electrodes.

RELATED ART DOCUMENT

[Patent Document]
[Patent Document 1] Japanese Unexamined Patent Application Publication No. 2016-100248

SUMMARY OF THE INVENTION

Problem to be Solved by the Invention

However, Patent Document 1 does not teach how to establish contact between the bus bar in a plate shape and electrode surfaces when vertical positions of surfaces on which the electrodes are disposed are different from each other due to a dimensional tolerance of the battery packs that are adjacent to each other.

Means for Solving the Problem

A power storage component module described in this specification includes power storage components, a bus bar, at least one positioning boss, and at least one through hole. The bus bar connects the power storage components to one another. The at least one positioning boss is provided on an electrode included in the power storage components. The at least one positioning boss protrudes upward. The at least one positioning boss includes a base end and a distal end having a diameter less than a diameter of the base end. The at least one through hole opens in the bus bar. The bus bar is placed on the at least one positioning boss and a hole edge of the at least one through hole is disposed around the at least one positioning boss between the base end of the at least one positioning boss and the distal end of the at least one positioning boss in a vertical direction. The power storage component module further includes at least one joint in which the hole edge is joined to the at least one positioning boss.

In the configuration, the at least one joint between the hole edge and the at least one positioning boss can be prepared by placing the bus bar on the at least one positioning boss at the vertical position between the base end of the at least one positioning boss and the distal end of the at least one positioning boss such that the hole edge surrounds the at least one positioning boss. That is, the at least one joint can be prepared with the bus bar is positioned with respect to the power storage components. Therefore, sections to be joined can be easily specified. Furthermore, the bus bar is placed on the at least one positioning boss that protrudes from the electrode. Therefore, even when the vertical position of one of the electrodes of the power storage components is higher than the vertical position of the other electrode, the bus bar can be slanted and placed on the at least one positioning boss of the power storage components without contacting the electrodes. Further, because the at least one through hole opens in the bus bar, the sections of the hole edge abutting on or adjacent to the at least one positioning boss are recognizable from above and can be specified to form the at least one joint.

Preferable embodiments according to the technology described herein may have the following configurations.

(1) The power storage components may include a first power storage component and a second power storage component. The at least one positioning boss may include positioning bosses included in the first power storage component and the second storage component, respectively. The positioning bosses may be arranged in a predefined direction. The at least one through hole may include two through holes in the bus bar. The through holes may be arranged in the predefined direction. Each of the through holes may have an oval shape elongated in the predefined direction. In a direction perpendicular to the predefined direction, a diameter of the at least one through hole may be less than a diameter of the base end of the at least one positioning boss and the diameter of the at least one through hole may be greater than a diameter of the distal end of the at least one positioning boss.

In the configuration, the through holes are arranged in the predefined direction. Further, each of the through holes has an oval shape that is elongated in the predefined direction. Therefore, even when the distance between the positioning bosses is greater, due to the position tolerance, than a distance between the positioning bosses that are disposed at the predefined positions, the hole edges of the at least one through hole are less likely to contact the positioning bosses in the predefined direction. Furthermore, in the direction perpendicular to the predefined direction, the diameter of the at least one through hole is less than the diameter of the base end of the corresponding positioning boss and the diameter of the at least one through hole is greater than the diameter of the distal end of the corresponding positioning boss. This ensures that the at least one through hole is arranged around the at least one positioning boss to form the at least one joint between the base end of the at least one positioning boss and the distal end of the at least one positioning boss in the vertical direction.

(2) The at least one joint may include a first joint and a second joint. The first joint and the second joint may be arranged with the at least one positioning boss between the first joint and the second joint in the direction perpendicular to the predefined direction.

According to the configuration, the sections to be joined can be specified by using the position of the at least one positioning boss as the standard and at the timing of forming the first joint and the second joint.

(3) The at least one positioning boss may taper from the base end to the distal end. The at least one positioning boss may have a truncated circular conical shape.

According to the configuration, the hole edge of the at least one through hole can be placed on any position between the base end of the at least one positioning boss and the distal end of the at least one positioning boss. Therefore, the degree of freedom for designing the diameter of the at least one through hole is enhanced in the direction perpendicular to the predefined direction in which the positioning bosses are arranged.

(4) The at least one positioning boss may include a pedestal section and a columnar section. The pedestal section may protrude from the electrode. The pedestal section may include the base end. The columnar section may include the distal end. The columnar section may protrude from a distal end of the pedestal section. The diameter of the at least one through hole may be greater than a diameter of a base end of the columnar section and the distal end of the pedestal section may be greater than the diameter of the at least one through hole.

Advantageous Effects of Invention

The power storage component modules according to the technology disclosed herein allow positional differences in the vertical direction between the power storage components that are adjacent to each other.

MODES FOR CARRYING OUT THE INVENTION

First Embodiment

A first embodiment will be described with reference to FIGS. 1 to 4.

Figure 3:
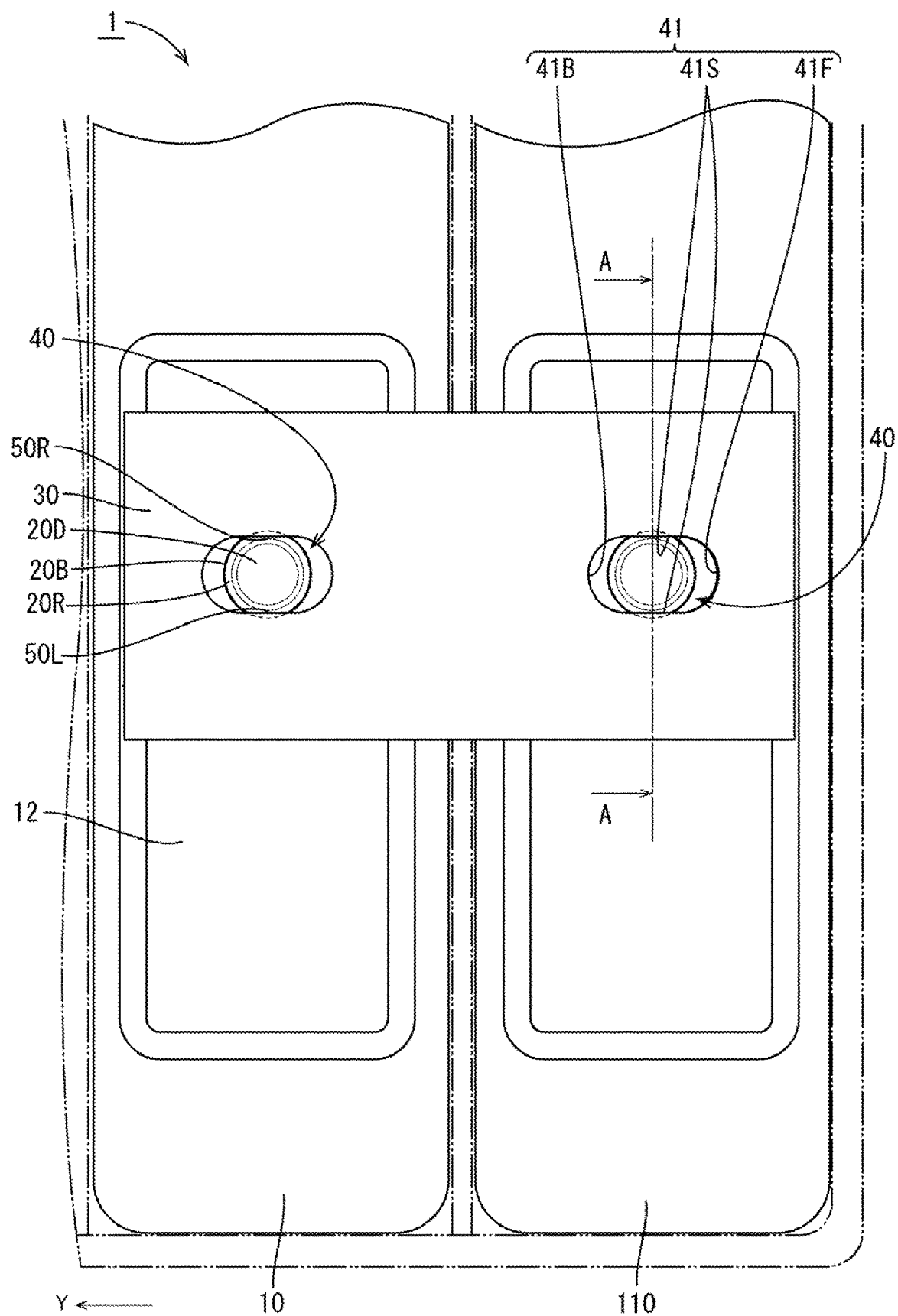
FIG. 3 is a top view illustrating the power storage component module.

This embodiment illustrates a power storage component module 1 to be installed in a vehicle and used in the vehicle. As illustrated in FIG. 3, the power storage component module 1 according to the embodiment includes power storage components 10, 110 (two in this embodiment) and a bus bar 30. The power storage components 10, 110 are accommodated in a module case MC. The bus bar 30 connects the power storage component 10 and the power storage component 110 to each other. Hereinafter, a Z arrow, a Y arrow, and an X arrow point to an upper side, a front side, and a left side, respectively. Dimensions of components in a right-left direction may be referred to as widths.

Figure 1:
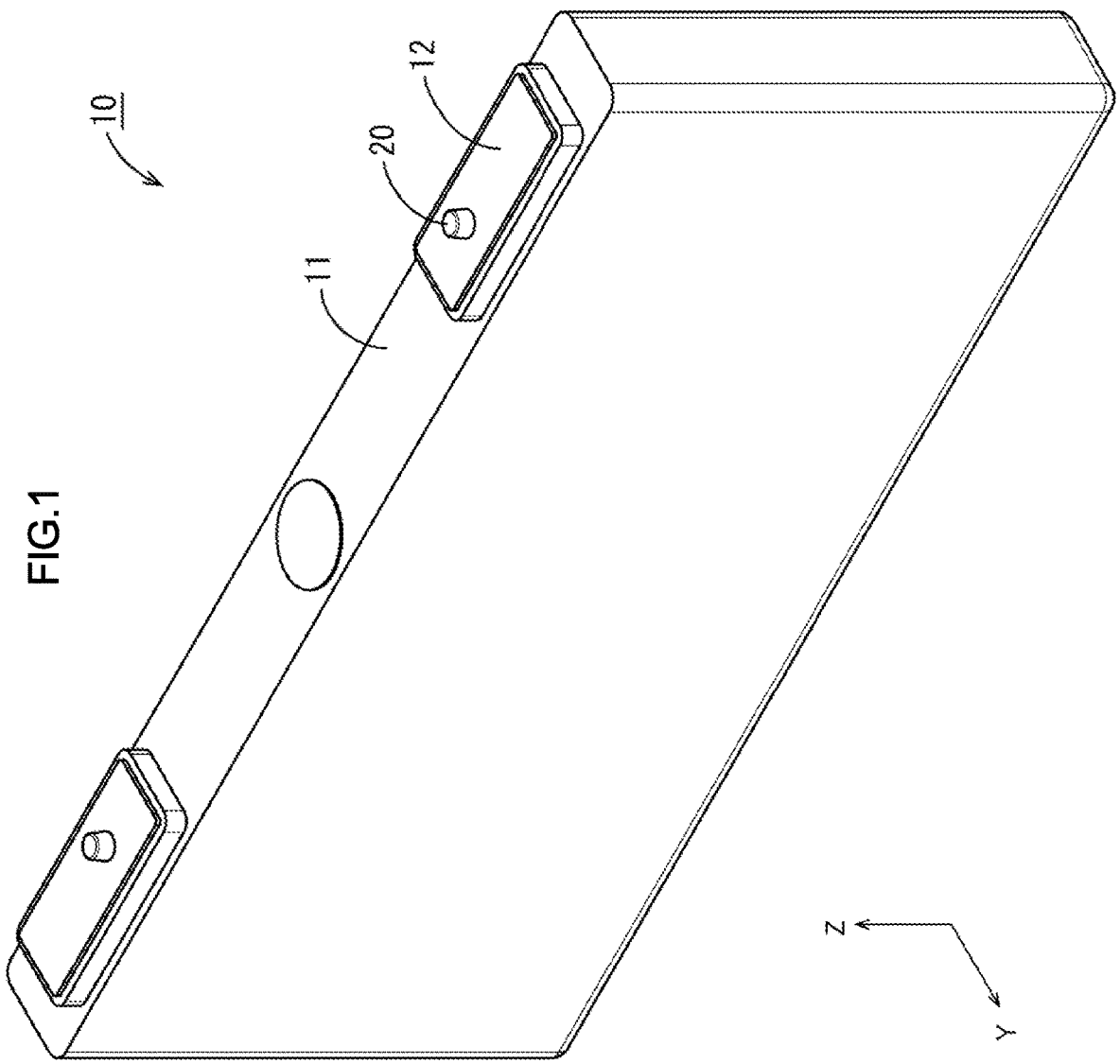
FIG. 1 is a top perspective view illustrating one of power storage components according to a first embodiment.

As illustrated in FIG. 1, a first power storage component 10 of the power storage components 10, 110 includes a component body 11 and an electrode 12 on a top surface of the component body 11. The component body 11 has a rectangular parallelepiped shape that is flattened in a front-rear direction. A top surface of the electrode 12 is flat.

Figure 2:
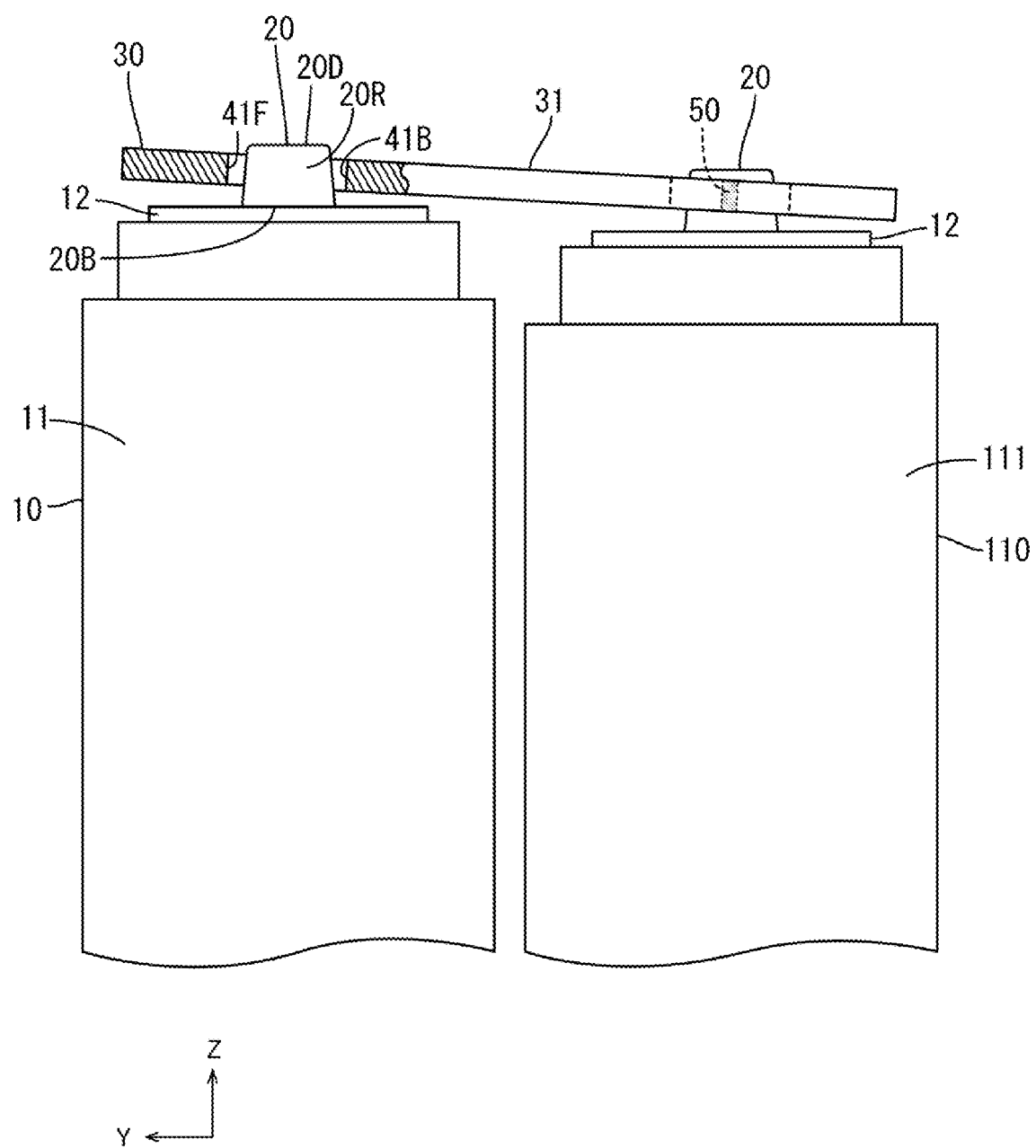
FIG. 2 is a side view illustrating a power storage component module according to the first embodiment.

As illustrated in FIGS. 1 to 3, a positioning boss 20 is provided on the electrode 12 of the first power storage component 10 for positioning the bus bar 30 with respect to the electrode 12. The positioning boss 20 is made from electrically conductive metal. The positioning boss 20 protrudes upward from the top surface of the electrode 12. The positioning boss 20 includes a base end 20B and a distal end 20D. The base end 20B has a circular shape when viewed from above. The distal end 20D has a circular shape that is concentric with the base end 20B. The positioning boss 20 has a truncated circular conical shape so that the positioning boss 20 tapers from the base end 20B toward the distal end 20D. In other words, a diameter of the distal end 20D of the positioning boss 20 is less than a diameter of the base end 20B of the positioning boss 20. The positioning boss 20 includes a tapered periphery 20R between the base end 20B and the distal end 20D. The tapered periphery 20R inclines inward toward the top. A second power storage component 110 has a configuration that is similar to the configuration of the first power storage component 10 except the electrode 12 of the second power storage component 110 has a polarity different from the polarity of the electrode 12 of the first power storage component 10.

As illustrated in FIGS. 2 and 3, the first power storage component 10 and the second power storage component 110 are arranged so that the electrode 12 of the first power storage component 10 and the electrode 12 of the second power storage component 110 are arranged in the front-rear direction. The first power storage component 10, the second power storage component 110, and the module case MC that accommodates the first power storage component 10 and the second power storage component 110 have dimensional tolerances, respectively. That is, the electrode 12 of the first power storage component 10 and the electrode 12 of the second power storage component 110 that are accommodated in the module case MC are disposed at vertical positions within position tolerances, respectively. Therefore, the electrode 12 of the first power storage component 10 and the electrode 12 of the second power storage component 110 are shifted from each other in a vertical direction. In this embodiment, the electrode 12 of the first power storage component 10 may be disposed at a position higher than the electrode 12 of the second power storage component 110. Further, the position errors may be at the maximums of the tolerance in a top-bottom direction, respectively.

The bus bar 30 is made from electrically conductive metal such as copper and aluminum. As illustrated in FIGS. 2 and 3, the bus bar 30 has a rectangular plate shape and includes two through holes 40 that are arranged in the front-rear direction. The through holes 40 open in a direction normal to a plate surface of the bus bar 30. If the positioning boss 20 of the first power storage component 10 and the positioning boss 20 of the second power storage component 110 are disposed at predefined positions without any positional errors, a distance between the centers of the through holes 40 in the front-rear direction is about equal to a distance between the center axis of the positioning bosses 20 of the first power storage component 10 and the second power storage component 110. The bus bar 30 is coupled to the positioning bosses 20 with the positioning bosses 20 inserted in the respective through holes 40. According to the configuration, the electrodes 12 of the power storage components 10, 110 are electrically connected to each other via the positioning bosses 20 and the bus bar 30.

As illustrated in FIG. 3, each of the through holes 40 has an oval shape that is elongated in the front-rear direction. A hole edge 41 of each through hole 40 includes an end-side arc section 41F, a center-side arc section 41B, and right and left linear sections 41S. Each of the right and left linear section 41S connects an end of the end-side arc section 41F and an end of the center-side arc section 41B to each other. Each of the right and left linear sections 41S are linear. The right and left linear sections 41S extend parallel to each other. The distance between the right and left linear sections 41S in the right-left direction (i.e., the maximal width of the through hole 40) is less than a diameter of the base end 20B of the positioning boss 20 and greater than a diameter of the distal end 20D of the positioning boss 20.

Arc shapes of the end-side arc section 41F and the center-side arc section 41B and the lengths of the right and left linear sections 41S are determined so that the end-side arc section 41F and the center-side arc section 41B do not contact the periphery of the positioning boss 20 even when the position errors of the first power storage component 10 and the second power storage component 110 in the vertical direction are at the maximum of the tolerance.

According to the configuration, as illustrated in FIG. 2, the hole edge 41 of the through hole 40 is positioned so that the end-side arc section 41F and the center-side arc section 41B are separated from the tapered periphery 20R of the positioning boss 20 in the front-rear direction.

The electrode 12 of the first power storage component 10 and the electrode 12 of the second power storage component 110 are disposed at different vertical positions from each other, as described above. Therefore, the bus bar 30 that is placed on the positioning bosses 20 that protrude from the electrodes 12 inclines downward toward the rear. A position of the bus bar 30 at which the bus bar 30 is placed on the positioning boss 20 is determined based on a dimensional relationship between a diameter of the positioning boss 20 and the width of the through hole 40 As illustrated in FIG. 2, the dimensional relationship is determined so that the bus bar 30 is to be disposed at a vertical position at which the bus bar 30 do not contact the component bodies 11 and the electrodes 12 of the first power storage component 10 and the second power storage component 110 even when an angle of the bus bar 30 is at the maximum.

Figure 4:
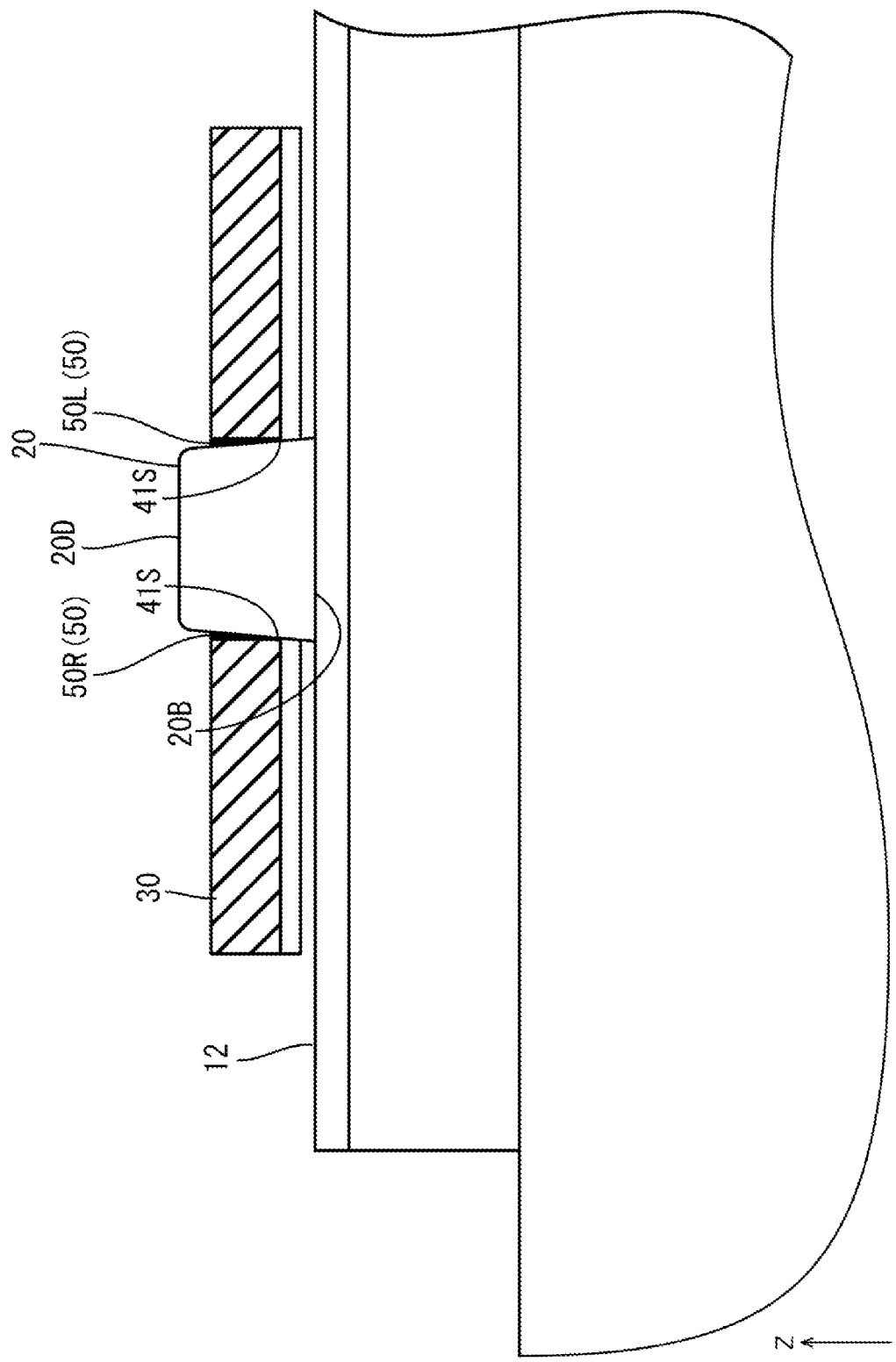
FIG. 4 is a cross-sectional view along line A-A in FIG. 3.

As illustrated in FIG. 4, in the right-left direction, a center of each of the right and left linear sections 41S of the hole edge 41 of each through hole 40 in the front-rear direction is on a section of the tapered periphery 20R. The section (a diameter section) is at a height at which the width of the positioning boss 20 is at the maximum between the base end 20B and the distal end 20D of the positioning boss 20. A section of the hole edge 41 on the section of the tapered periphery 20R and a section of the hole edge 41 around the section on the tapered periphery 20R and adjacent to the tapered periphery 20R are laser welded to the tapered periphery 20R from above by a laser welding means, which is not illustrated. Joints 50 (a first joint 50L and a second joint 50R) are formed through the laser welding. The joints 50 electrically connect the bus bar 30 to the positioning boss 20. That is, the first joint 50L and the second joint 50R are arranged in the right-left direction with the positioning boss 20 between the first joint 50L and the second joint 50R.

For the laser welding, the diameter section of the positioning boss 20, which has the diameter at the maximum in the right-left direction, is detected from above and sides of the diameter section of the positioning boss 20 is determined as joint sections. If the positioning boss 20 having the truncated circular conical shape is cut along an imaginary plane extended from a tangible section of the bus bar 30, the cross section of the positioning boss 20 may have an oval shape that is narrower in the right-left direction. Therefore, the length of each of the joints 50L, 50R increases as the angle of the bus bar 30 increases and thus the stability of the electrical connection improves.

The above-described configuration is for deviation in relative position of the power storage components 10, 110 in the vertical direction. However, the configuration is for deviation in relative position of the power storage components 10, 110 in the right-left direction and/or the front-rear direction because each positioning boss 20 has the truncated circular conical shape and each through hole 40 has an oval shape that is elongated along the direction in which the through holes 40 are arranged.

In the configuration of this embodiment, the power storage component module 1 includes the power storage components 10, 110, the bus bar 30, the positioning bosses 20 and the through holes 40. The bus bar 30 connects the power storage components 10, 110 to each other. The positioning bosses 20 are provided on the electrodes 12 included in the power storage components 10, 110. The positioning bosses 20 protrude upward such that the diameter of the distal end 20D of each positioning boss 20 is less than the diameter of the base end 20B. The through holes 40 open in the bus bar 30. The bus bar 30 is disposed on the positioning bosses 20 at the vertical position between the base ends 20B and the distal ends 20D such that the hole edge 41 of each through hole 40 surrounds the corresponding positioning boss 20. The joints 50 in which the hole edges 41 are joined to the respective positioning bosses 20 are defined.

The joints 50 between the hole edges 41 and the respective positioning bosses 20 can be prepared by placing the bus bar 30 on the positioning bosses 20 at the vertical position between the base ends 20B of the positioning bosses 20 and the distal ends 20D of the positioning bosses 20 such that the hole edges 41 surround the respective positioning bosses 20. That is, the joints 50 can be prepared with the bus bar 30 is positioned with respect to the power storage components 10, 110. Therefore, sections to be joined can be easily specified. Furthermore, the bus bar 30 is placed on the positioning bosses 20 that protrude from the electrodes 12. Therefore, even when the vertical position of one of the electrodes 12 of the power storage components 10, 110 is higher than the vertical position of the other electrode 12, the bus bar 30 can be slanted and placed on the positioning bosses 20 of the power storage components 10, 110 without contacting the electrodes 12. Further, because the through holes 40 open in the bus bar 30, the sections of the hole edges 41 abutting on or adjacent to the respective positioning bosses 20 are recognizable from above and can be specified to form the joints 50.

The power storage components 10, 110 include the first power storage component 10 and the second power storage component 110. Each of the first power storage component 10 and the second power storage component 110 includes the positioning boss 20. The positioning boss 20 of the first power storage component 10 and the positioning boss 20 of the second power storage component 110 are arranged in a single direction. The through holes 40 of the bus bar 30 include two through holes 40. The through holes 40 are arranged in the direction. Each of the through holes 40 has the oval shape elongated in the direction. In the direction perpendicular to the direction, the diameter of the through hole 40 is less than the diameter of the base end 20B of the positioning boss 20 and the diameter of the through hole 40 is greater than the diameter of the distal end 20D of the positioning boss 20.

In the configuration, the through holes 40 are arranged in a direction. Further, each of the through holes 40 has the oval shape that is elongated in the direction. Therefore, even when the distance between the positioning bosses 20 is greater, due to the position tolerance, than a distance between the positioning bosses 20 that are disposed at the predefined positions, the hole edges 41 of the through holes 40 are less likely to contact the respective positioning bosses 20 in the direction. In the direction perpendicular to the direction, the diameter of each through hole 40 is less than the diameter of the base end 20B of the corresponding positioning boss 20 and the diameter of the through hole 40 is greater than the diameter of the distal end 20D of the corresponding positioning boss 20. This ensures that the through hole 40 is arranged around the positioning boss 20 to form the joints 50 between the base end 20B of the positioning boss 20 and the distal end 20D of the positioning boss 20 in the vertical direction.

The joints 50 includes the first joint 50L and the second joint 50R. The first joint 50L and the second joint 50R are arranged with the positioning boss 20 between the first joint and the second joint in the direction perpendicular to the direction.

According to the configuration, the sections to be joined can be specified by using the position of the positioning boss 20 as the standard at the timing of forming the first joint 50L and the second joint 50R.

Furthermore, the positioning boss 20 tapers from the base end 20B to the distal end 20D. The positioning boss 20 has a truncated circular conical shape.

According to the configuration, the hole edge 41 of the at least one through hole 40 can be placed on any position between the base end 20B of the positioning boss 20 and the distal end 20D of the positioning boss 20. Therefore, the degree of freedom for designing the diameter of the through hole 40 is enhanced in the direction perpendicular to the direction in which the positioning bosses 20 are arranged.

Second Embodiment

Next, a second embodiment will be described with reference to FIGS. 5 and 6. A power storage component module 1001 according to this embodiment is obtained by changing the configuration of the positioning bosses 20 according to the first embodiment. The reference numbers for the configurations of the second embodiment correspond to the configurations of the first embodiment have the numbers in which 1000 is added to the corresponding reference numbers of the first embodiment. The similar configurations, operations and effects to those of the first embodiment will not be described. For the same configurations as those of the first embodiment, the same reference numbers will be used.

Figure 5:
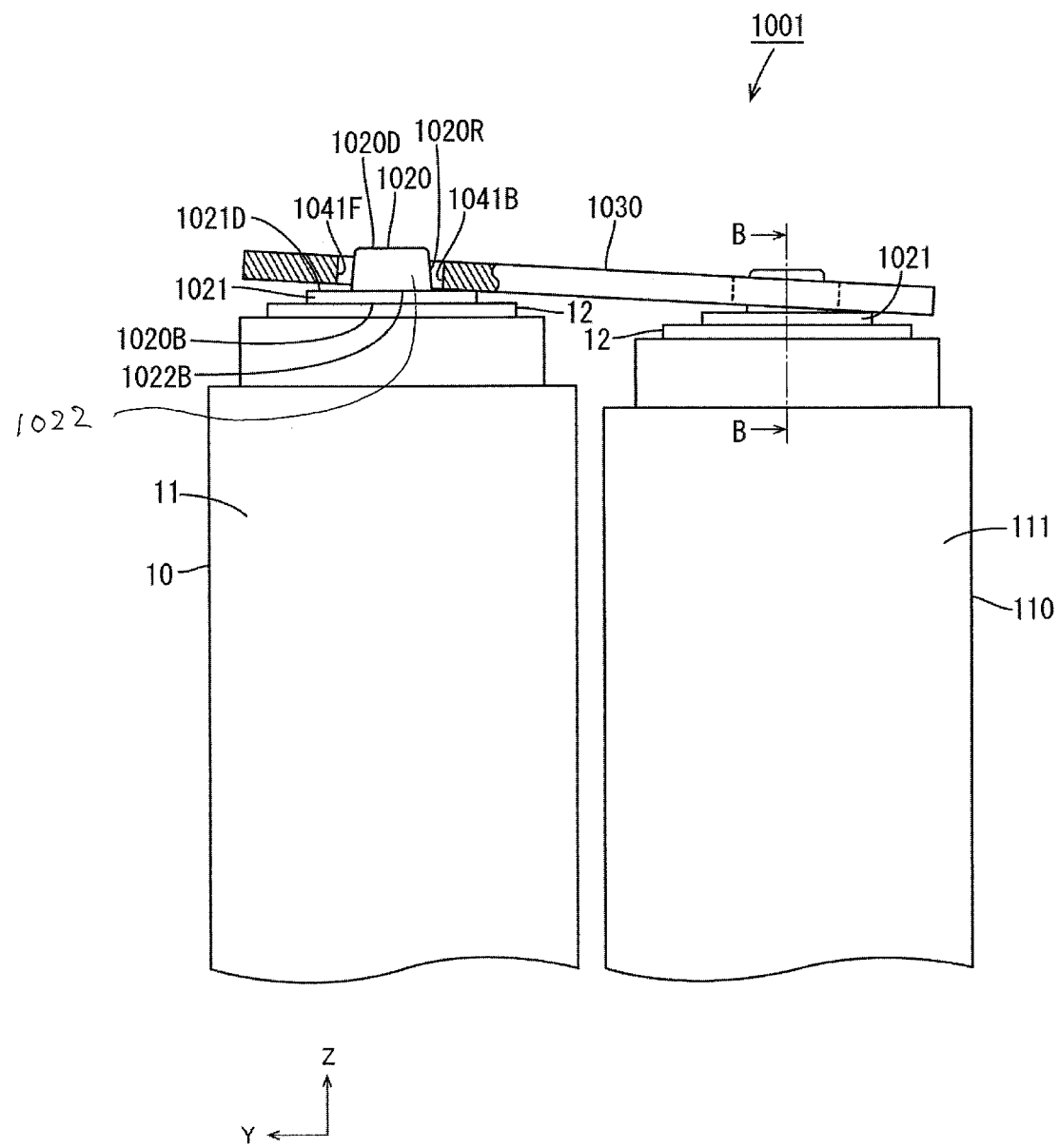
FIG. 5 is a side view illustrating a power storage component module according to a second embodiment.

As illustrated in FIG. 5, a positioning boss 1020 include a pedestal section 1021 and a columnar section 1022. The pedestal section 1021 protrudes upward from a base end 1020B. The pedestal section 1021 has a truncated circular conical shape that slightly tapers toward a distal end 1021D of the pedestal section 1021. The columnar section 1022 protrudes upward from the distal end 1021D of the pedestal section 1021. The columnar section 1022 has a truncated circular conical shape that gradually tapers toward a distal end 1020D of the columnar section 1022. A diameter of the distal end 1021D of the pedestal section 1021 is greater than a base end 1022B of the columnar section 1022.

The distance between two linear sections 1041S of a hole edge 1041 of a through hole 1040 of a bus bar 1030 in the right-left direction (in other words, the maximal width of the through hole 1040) is slightly greater than a diameter of the base end 1022B of the columnar section 1022 and is less than a diameter of the distal end 1021D of the pedestal section 1021.

Regarding each of the arc shapes of arc sections 1041F, 1041B and the length of the linear sections 1041S in the front-rear direction, shapes and dimensions are determined so as not to obstruct a contact of the columnar section 1022 and the linear sections 1041S even when the positional difference between the electrodes 12 is the maximum in the vertical direction.

In the configuration, the bus bar 1030 is disposed on the rear ends of the distal ends 1021D of the pedestal sections 1021 (refer to FIG. 5) in both of the first power storage component 10 and the second power storage component 110. Each of two linear sections 1041S of the hole edge 1041 of the bus bar 1030 is disposed at a slightly separated position toward the sides from a tapered periphery 1022R of the columnar section 1022. Joints 1050L and 1050R are defined by the linear sections 1041S and the tapered periphery 1022R (refer to FIG. 6).

In the configuration of this embodiment, the positioning boss 1020 includes the pedestal section 1021 and the columnar section 1022. The pedestal section 1021 includes the base end 1020B. The pedestal section 1021 protrudes from the electrode 12. The columnar section 1022 protrudes from the distal end 1021D of the pedestal section 1021. The columnar section 1022 includes the distal end 1020D. The diameter of the through hole 1040 is greater than the diameter of the base end 1022B of the columnar section 1022. The diameter of the distal end 1021D of the pedestal section 1021 is greater than the diameter of the through hole 1040.

According to the configuration, the bus bar 1030 is placed on the distal ends 1021D of the pedestal sections 1021. Therefore, the posture of the bus bar 1030 is stable when the joints 1050L and 1050R are formed. Further, the bus bar 1030 (the linear sections 1041S is not required to contact the tapered periphery 1022R of the columnar section 1022. The bus bar 1030 is only required to be disposed at a position close to the tapered periphery 1022R of the columnar section 1022 so that the laser welding can be applicable. Therefore, the dimensions of the tapered periphery 1022R and the through hole 1040 can be easily designed.

Third Embodiment

Figure 7:
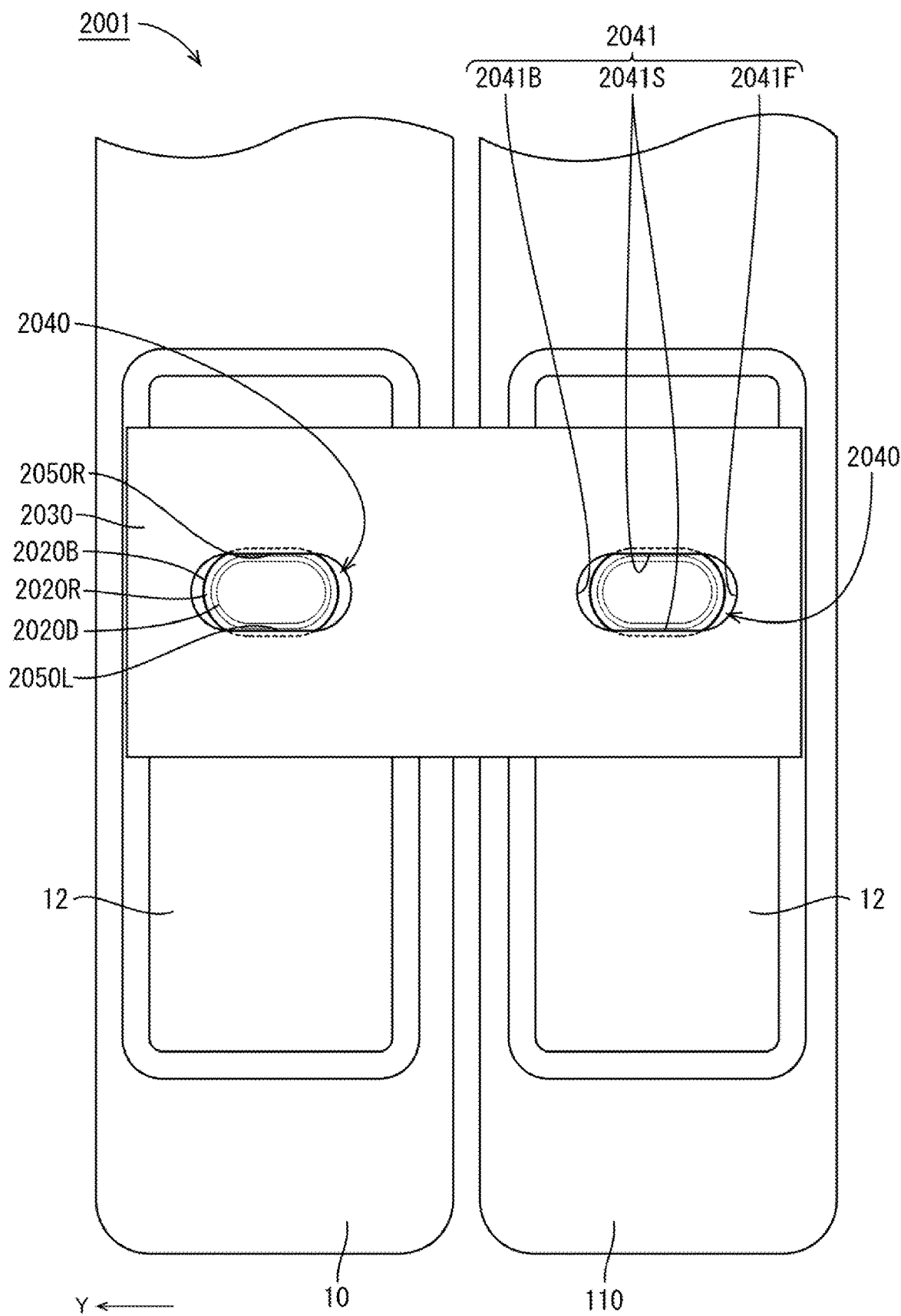
FIG. 7 is a top view illustrating a power storage component module according to a third embodiment.

Next, a third embodiment will be described with reference to FIG. 7. A power storage component module 2001 according to this embodiment including positioning bosses and through holes having configurations different from the configurations of the positioning bosses 20 and the through holes 40 in the first embodiment. The reference numbers for the configurations of the third embodiment correspond to those of the first embodiment have the numbers in which 2000 is added to the corresponding reference numbers of the first embodiment. The same configurations, operations, and effects as those of the first embodiment will not be described. For the same configurations as those of the first embodiment, the same reference numbers will be used.

The positioning boss 20 according to the first embodiment has a truncated circular conical shape. On the other hand, a positioning boss 2020 according to this embodiment has a truncated elliptic conical shape in which each of a base end 2020B and a distal end 2020D has an elliptic shape. The base end 2020B and the distal end 2020D are similar to each other. Accordingly, linear sections 2040S of through holes 2040 that open in a bus bar 2030 are longer in the front-rear direction compared with the configuration of the first embodiment.

Figure 6:
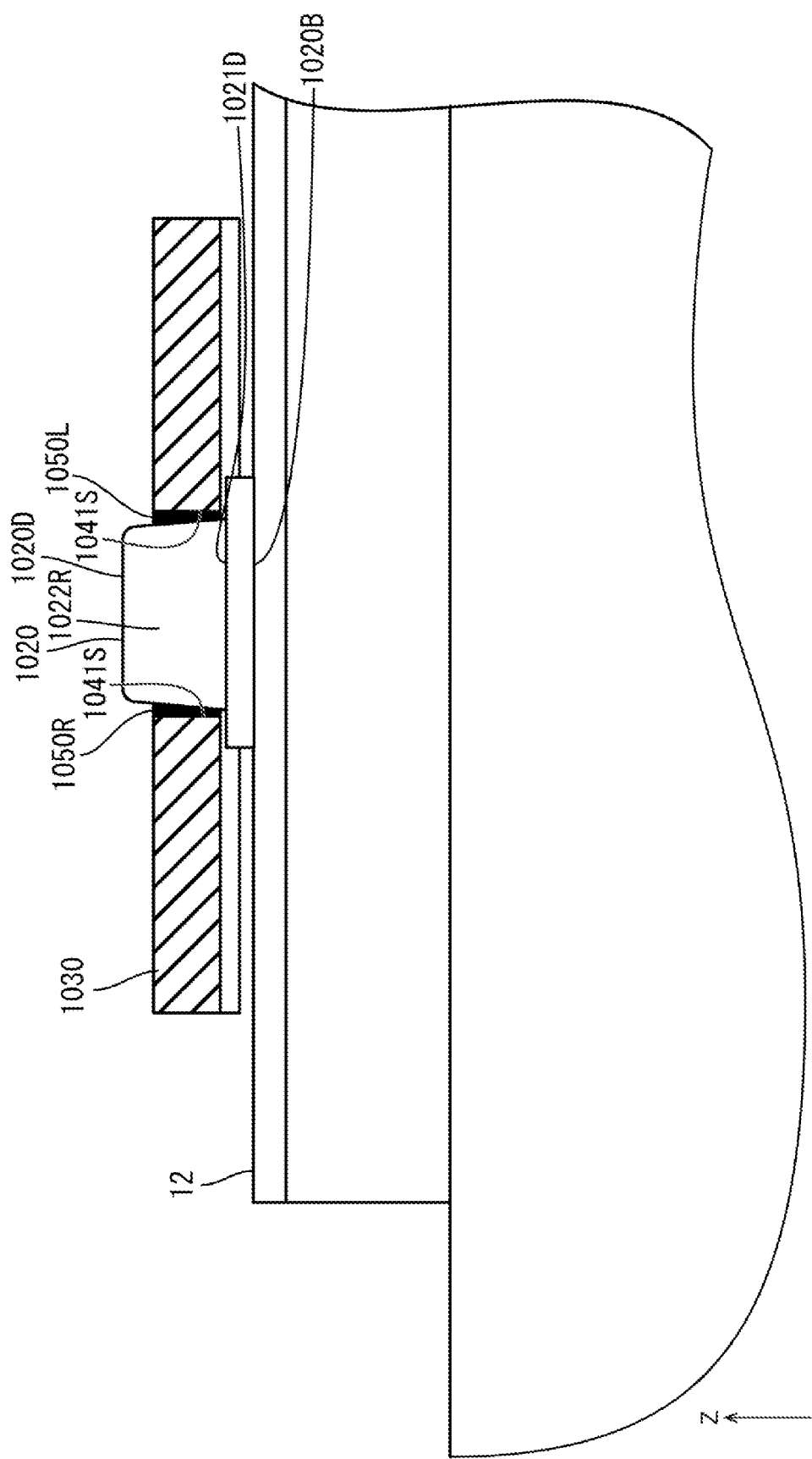
FIG. 6 is a cross-sectional view along line B-B in FIG. 5.

According to the configuration, as illustrated in FIG. 6, joints 2050L, 2050R are longer in the front-rear direction compared with the configuration of the first embodiment. This configuration further improves the stability of electrical connection state. Therefore, this configuration is effective in a case where the position deviations between the electrodes are negligibly small within the tolerance in the right-left direction.

Other Embodiments

The technology disclosed herein is not limited to the embodiments that are illustrated in the above description and the drawings. For example, the technology will be also obtained by the following embodiments.

(1) In the above embodiments, the positioning bosses 20 are provided on both of the first power storage component 10 and the second power storage component 110 among the power storage components 10, 110, and the bus bar 30 has two through holes 40. However, the number of the positioning bosses and the number of the through holes 40 are not limited to these configurations. For example, a positioning boss may be provided on only one of the power storage components and the bus bar may have only one through hole. In this case, an end without the through hole of the bus bar is directly placed on the electrode without the positioning boss of the power storage components, to form the joints that are defined by the end without the through hole of the bus bar and the electrode without the positioning boss of the power storage component, for example. With this configuration, the end without the through hole of the bus bar can be electrically connected to the electrode without the positioning boss of the power storage component.

(2) In the above embodiments, the positioning boss 20 has the circular shape or the elliptic shape that is elongated in the front-rear direction when viewed from above. Further, the whole (in the first embodiment and in the third embodiment) or a section (the columnar section in the second embodiment) of the positioning boss 20 tapers toward the top. However, the shape of the positioning boss is not limited to these configurations. The positioning boss according to the first embodiment may have a hemisphere shape protruding upward from the electrode, for example. Further, the columnar section according to the second embodiment may have the same diameter from the base end to the distal end.

(3) In the above embodiments, the through hole 40 has the oval shape including the end-side arc section 41F that has an arc shape, the center-side arc section 41B that has an arc shape, and the right and left linear sections 41S that have straight line shapes. However, the configurations of the through holes and the shapes of the through holes are not limited to these configurations. For example, the end-side arc section can be omitted. That is, the through hole may be a slit-shaped through hole that opens toward an end of the bus bar in the front-rear direction. In another case, the center-side arc section can be omitted, for example. That is, two through holes may be combined as a through hole to be a shape in which a section between the through holes is notched. Two positioning bosses may be through the through hole.

(4) In the above embodiments, the joints 50 are formed on the both sides of the positioning boss 20. However, the number of the joints is not limited to this configuration. Further, the positions of the joints are not limited to this configuration. For example, in the second embodiment, the joint may be formed on only one side of the positioning boss. Further, the section where the bus bar contacts the pedestal section may be joined as the joint in the second embodiment. In these cases, the center point of the positioning boss may be detected from above at the timing of the laser welding, for example. The point where the bus bar contacts the pedestal section can be estimated by using the center point of the positioning boss as the standard.

(5) In the above embodiments, the joints 50 are formed by the laser welding. However, the joining method is not limited to this configuration. For example, the brazing can be adopted as the joining method. In this case, by detecting the section to be joined from above and dropping any joint materials such as silver solder and solder from above, the joint can be formed.

EXPLANATION OF SYMBOLS

10, 110: Power storage component
10: First power storage component
110: Second power storage component
12: Electrode
20: Positioning boss
20B, 1020B: Base end
20D, 1020D: Distal end
30: Bus bar
40: Through hole
50: Joint
50L: First joint
50R: Second joint
1020: Positioning boss
1021: Pedestal section
1021D: Distal end of the pedestal section
1022: Columnar section
1022B: Base end of the columnar section
1040: Through hole

The invention claimed is:

1. A power storage component module comprising:
a first power storage component and a second power storage component a bus bar connecting the first power storage component and the second power storage component to one another;
positioning boss positioning bosses, each of which is provided on a respective electrode included in each of the first power storage component and the second power storage component, each of the positioning bosses protruding upward and including a base end and a distal end having a diameter less than a diameter of the base end;
two through holes opening in the bus bar, wherein
the bus bar is placed on the positioning bosses and a hole edge, of a respective one of the two through holes, is disposed around a respective one of the positioning bosses between the base end of the respective one of the positioning bosses and the distal end of the respective one of the positioning bosses in a vertical direction, and
the hole edge is joined to the respective one of the positioning bosses to define a respective joint;
wherein the positioning bosses are arranged in a predefined direction, the two through holes are arranged in the predefined direction, each of the two through holes has an oval shape elongated in the predefined direction, and in a direction perpendicular to the predefined direction, a diameter of each of the two through holes is less than a diameter of the base end of the respective one of the positioning bosses and greater than a diameter of the distal end of the respective one of the positioning bosses; and wherein the respective joint includes a first joint and a second joint, and the first joint and the second joint are arranged with the respective one of the positioning bosses between the first joint and the second joint in the direction perpendicular to the predefined direction, and wherein the first joint and the second joint are aligned in a direction that is orthogonal to both the predefined direction and the protruding direction of the respective one of the positioning bosses.

2. The power storage component module according to claim 1, wherein each of the positioning bosses taper from the base end to the distal end, and each of the positioning bosses has a truncated circular conical shape.

3. The power storage component module according to claim 1, wherein each of the positioning bosses include:

a pedestal section and a columnar section, the pedestal section protrudes from the respective electrode and includes the base end of the respective one of the positioning bosses, the columnar section includes the distal end of the respective one of the positioning bosses and protrudes from a distal end of the pedestal section, and the diameter of the respective one of the two through holes is greater than a diameter of a base end of the columnar section and a diameter of the distal end of the pedestal section is greater than the respective diameter of the respective one of the two through holes.

* * * * *

UNITED STATES PATENT AND TRADEMARK OFFICE
CERTIFICATE OF CORRECTION

| | |
|---|---|
| PATENT NO. | : 11,962,038 B2 |
| APPLICATION NO. | : 16/973487 |
| DATED | : April 16, 2024 |
| INVENTOR(S) | : N. Matsumura et al. |

It is certified that error appears in the above-identified patent and that said Letters Patent is hereby corrected as shown below:

On the Title Page

In item (73) Assignees, please change "SUMITOMO ELECTRIC INDUSTRIES, LTD., Mie (JP)" to -- SUMITOMO ELECTRIC INDUSTRIES, LTD., Osaka (JP) --

In item (73) Assignees, please change "TOYOTA JIDOSHA KABUSHIKI KAISHA, Osaka (JP)" to -- TOYOTA JIDOSHA KABUSHIKI KAISHA, Aichi-ken (JP) --

In the Claims

Column 10, Line 40 (Claim 1, Line 1) please change "module comprising:" to -- module, comprising: --

Column 10, Line 42 (Claim 1, Line 3) please change "component a" to -- component; a --

Column 10, Line 45 (Claim 1, Line 6) please change "positioning boss positioning bosses" to -- positioning bosses --

Signed and Sealed this
Twenty-fifth Day of June, 2024

Katherine Kelly Vidal
*Director of the United States Patent and Trademark Office*